US012678860B2

(12) United States Patent
Jangam et al.

(10) Patent No.: US 12,678,860 B2
(45) Date of Patent: Jul. 14, 2026

(54) THREE-DIMENSIONAL PRINTING OF METAL OBJECTS USING BINDING AGENT WITH COPPER NITRATE

(71) Applicant: PERIDOT PRINT LLC, Palo Alto, CA (US)

(72) Inventors: John Samuel Dilip Jangam, Palo Alto, CA (US); Thomas Craig Anthony, Palo Alto, CA (US); Lihua Zhao, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 509 days.

(21) Appl. No.: 18/029,084

(22) PCT Filed: Oct. 21, 2020

(86) PCT No.: PCT/US2020/056631
§ 371 (c)(1),
(2) Date: Mar. 28, 2023

(87) PCT Pub. No.: WO2022/086518
PCT Pub. Date: Apr. 28, 2022

(65) Prior Publication Data
US 2023/0373004 A1 Nov. 23, 2023

(51) Int. Cl.
| | |
|---|---|
| *B22F 10/16* | (2021.01) |
| *B22F 1/105* | (2022.01) |
| *B22F 1/107* | (2022.01) |
| *B22F 10/64* | (2021.01) |
| *B33Y 10/00* | (2015.01) |
(Continued)

(52) U.S. Cl.
CPC .............. *B22F 10/16* (2021.01); *B22F 1/105* (2022.01); *B22F 1/107* (2022.01); *B22F 10/64* (2021.01); *B33Y 10/00* (2014.12); *B33Y 40/20* (2020.01); *B33Y 70/10* (2020.01); *B22F 2301/10* (2013.01); *B22F 2302/30* (2013.01); *B22F 2304/10* (2013.01); *B22F 2998/10* (2013.01)

(58) Field of Classification Search
None
See application file for complete search history.

(56) References Cited

U.S. PATENT DOCUMENTS

2015/0125334 A1    5/2015    Uetani et al.

FOREIGN PATENT DOCUMENTS

| | | |
|---|---|---|
| CN | 107877848 A | 4/2018 |
| CN | 110125417 A | 8/2019 |
| WO | 2019/017926 A1 | 1/2019 |
(Continued)

OTHER PUBLICATIONS

Bai, Y et al., "An exploration of binder jetting of copper", Rapid Prototyping Journal, 2015, 22 pages.
(Continued)

*Primary Examiner* — Joseph S Del Sole
(74) *Attorney, Agent, or Firm* — Dierker & Kavanaugh, P.C.

(57) ABSTRACT

The present disclosure is drawn to a three-dimensional printing kit and can include a particulate build material including from about 80 wt % to about 100 wt % metal particles, and a binding agent including water, from about 0.01 wt % to about 5 wt % organic compounds, and from about 20 wt % to about 60 wt % copper nitrate.

10 Claims, 3 Drawing Sheets

(51) Int. Cl.
B33Y 40/20 (2020.01)
B33Y 70/10 (2020.01)

(56) References Cited

FOREIGN PATENT DOCUMENTS

WO    WO-2019/088965  A1 *   5/2019
WO       2020/190335  A1     9/2020

OTHER PUBLICATIONS

Miyanaji, H., et al., "Binder Jetting Additive Manufacturing of Copper Foam Structures", Additive Manufacturing, Nov. 18, 2019, 20 pages.

* cited by examiner

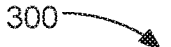

300 iteratively applying individual layers of a particulate build material comprising from about 80 wt% to about 100 wt% metal particles — 310 based on a 3D object model, selectively and iteratively applying a binding agent to the individual layers of the particulate build material to define a green body object formed from multiple individual layers within a powder bed of the particulate build material, wherein the binding agent comprises an aqueous liquid vehicle and a copper nitrate — 320 heat curing the green body object by heat soaking the green body object at a temperature within the range of about 70 °C to about 200 °C for about 30 minutes to about 8 hours after the green body object is formed, wherein after heat curing, from about 30 wt% to 100 wt% of the copper nitrate applied to the green body object is in the form of copper hydroxynitrate — 330

FIG. 3

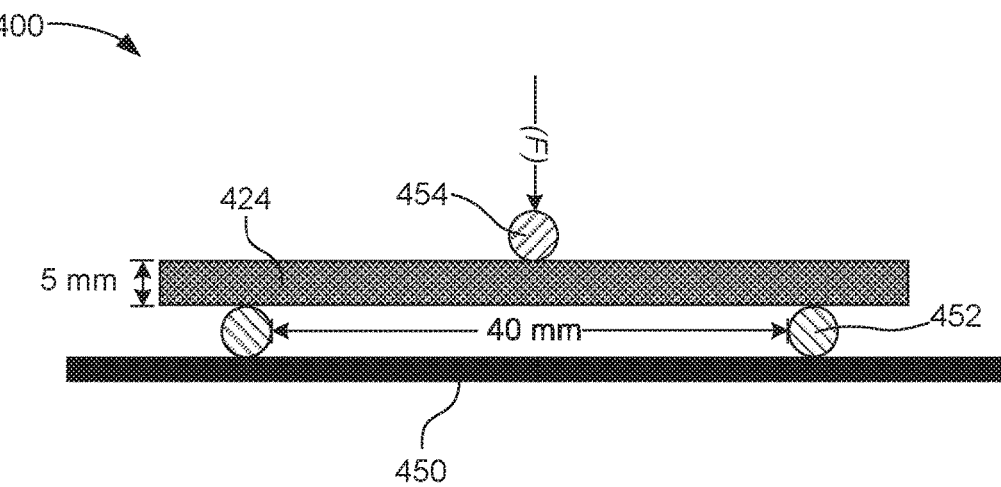

FIG. 4

THREE-DIMENSIONAL PRINTING OF METAL OBJECTS USING BINDING AGENT WITH COPPER NITRATE

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of build material. This is unlike other machining processes, which often rely upon the removal of material to create the final part. Some three-dimensional printing methods use chemical binders or adhesives to bind build materials together. Other three-dimensional printing methods involve sintering or partial sintering, melting, etc., of the build material. For some three-dimensional printing methods, melting or partial melting of build material may be accomplished using heat-assisted extrusion, and for some other materials (e.g., polymerizable materials), solidification as a unitary object may be accomplished using, for example, ultra-violet light or infrared light.

BRIEF DESCRIPTION OF THE DRAWINGS

FIG. 3 is a flow diagram illustrating an example method of three-dimensional printing in accordance with the present disclosure;

FIG. 4 illustrates an example flexural strength apparatus that can be used to evaluate flexural strength provided by various compositions for use in three-dimensional printing in accordance with the present disclosure.

DETAILED DESCRIPTION

Figure 1:
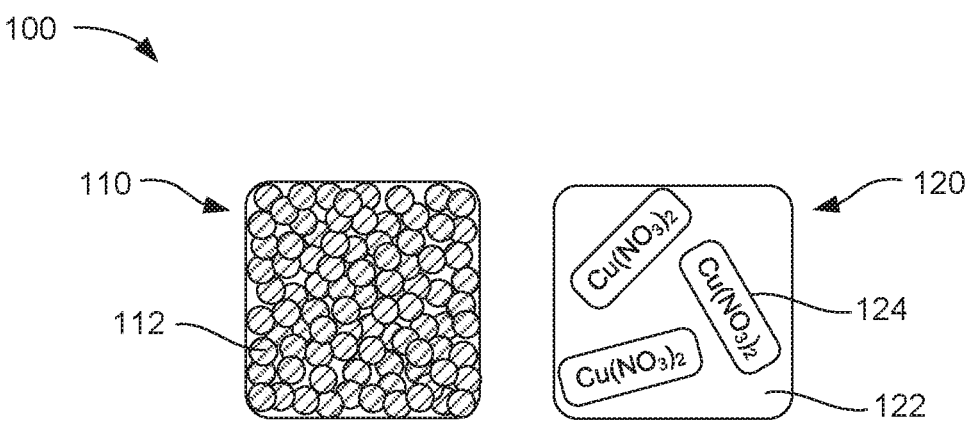
FIG. 1 schematically illustrates an example three-dimensional printing kit in accordance with the present disclosure.

The present disclosure describes materials and methods that can be used to form three-dimensional (3D) printed articles from a metal powder build material. The three-dimensional printing processes described herein can be used to form a green body object of metal particle bound together with a binder. By heat curing the green body object prior to fusing or sintering, the green body object can be strengthened and performs better through the higher temperatures that the object passes through up to fusing or sintering temperatures where the durable metal three-dimensional printed article is ultimately formed. In one example, the copper nitrate acts as a binder, sticking together copper powder particles, but due to the heat curing that occurs, a large percentage of the copper nitrate may convert to copper hydroxynitrate, which can surface bind to the metal particles of the particulate build material, thereby increasing the strength of the green body object from a satisfactory strength provided by latex binders, e.g., from about 3 MPa to about 5 MPa, to part strengths greater than about 8 MPa, greater than about 10 MPa, or even part strengths greater than about 13 MPa, which may be even more suitable for object transport, decaking, enhancing stability while ramping up temperatures for object fusing, etc.

In accordance with this, a three-dimensional printing kit can include a particulate build material comprising from about 80 wt % to about 100 wt % metal particles, and a binding agent including water, from about 0.01 wt % to about 5 wt % organic compounds, and from about 20 wt % to about 60 wt % copper nitrate. In one more specific example, the particulate build material can include from about 95 wt % to about 100 wt % copper. In one example, the metal particles can include aluminum, titanium, copper, cobalt, chromium, nickel, vanadium, tungsten, tungsten carbide, tantalum, molybdenum, magnesium, gold, silver, ferrous alloy, stainless steel, steel, an alloy thereof, or an admixture thereof. In another example, from about 60 wt % to 100 wt % of the organic compounds in the binding agent are in the form of organic co-solvent, surfactant, or a combination thereof. In still another example, the copper nitrate can be in the form of a hydrated copper nitrate.

In another example, a three-dimensional printing system can include a particulate build material comprising from about 80 wt % to about 100 wt % metal particles to be applied as individual layers during a build of a green body object, and a binding agent to selectively apply to the individual layers during the build to form the green body object in layers within a powder bed of the particulate build material. The binding agent can include an aqueous liquid vehicle and a copper nitrate. The three-dimensional printing system can also include a heat curing device to cure the green body object by applying a heating profile to the green body object at a temperature within the range of about 70° C. to about 200° C. for 30 minutes to 8 hours, wherein after heat curing, from about 30 wt % to 100 wt % of the copper nitrate in the green body object is in the form of copper hydroxynitrate. The heat curing device can include a powder bed heater thermally couplable or coupled to the green body object while the green body object is present in the powder bed of the particulate build material to provide a temperature to the green body object ranging from about 70° C. to about 120° C. for about 30 minutes to about 4 hours after the green body object is formed. The heat curing device can alternatively or additional include a heating oven to provide a temperature to the green body object ranging from about 120° C. to about 200° C. for about 30 minutes to about 8 hours. The three-dimensional printing system can also include a fusing oven to bring the green body object to a fusing temperature from about 600° C. to about 3,500° C. for a period of time from about 1 hour to about 30 hours to form a heat-fused metal object. In one example, the heat curing device to cure the green body object can be the fusing oven.

In another example, a method of three-dimensional printing can include iteratively applying individual layers of a particulate build material comprising from about 80 wt % to about 100 wt % metal particles, and based on a 3D object model, selectively and iteratively applying a binding agent to the individual layers of the particulate build material to define a green body object formed from multiple individual layers within a powder bed of the particulate build material. The binding agent can include, for example, an aqueous liquid vehicle and a copper nitrate. The method can also include heat curing the green body object by heat soaking the green body object at a temperature within the range of about 70° C. to about 200° C. for about 30 minutes to about 8 hours after the green body object is formed, wherein after heat curing, from about 30 wt % to 100 wt % of the copper nitrate applied to the green body object is in the form of copper hydroxynitrate. In one example, heat curing the green body object can occur at a temperature from about 70° C. to about 120° C. for about 30 minutes to about 4 hours while the green body object is within the powder bed. In another example, heat curing the green body object can occur at a temperature from about 120° C. to about 200° C. for about 30 minutes to about 8 hours after the green body object is removed from the powder bed. In another example, heat curing the green body object occurs at a temperature from about 70° C. to about 120° C. for about 30 minutes to about 4 hours while the green body object is within the powder bed, and subsequently heat curing the green body object further at a temperature from about 120° C. to about 200° C. for about 30 minutes to about 8 hours after the green body object is removed from the powder bed. In still another example, heat curing can provide that from about 75 wt % to 100 wt % of the copper nitrate in the green body object is in the form of copper hydroxynitrate. The method can further include fusing the green body object in a fusing oven at a fusing temperature from about 600° C. to about 3,500° C. for a period of time from about 1 hour to about 30 hours to form a heat-fused metal object.

When discussing the three-dimensional printing kits, the methods of three-dimensional printing, and/or the three-dimensional printing systems, these discussions can be considered applicable to one another whether or not they are explicitly discussed in the context of that example. Thus, for example, when discussing the binding agent in the context of the three-dimensional printing kits, such disclosure is also relevant to and directly supported in the context of the methods of three-dimensional printing and/or the three-dimensional printing systems, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

In accordance with the present disclosure, an example three-dimensional printing kit 100 is shown in FIG. 1. The three-dimensional printing kit can include a particulate build material 110 and a binding agent 120. The particulate build material can include from about 80 wt % to about 100 wt % metal particles 112. The binding agent can include a liquid vehicle 122 and copper nitrate 124 as a binder compound. In one specific example, three-dimensional printing kits can include a particulate build material comprising from about 80 wt % to about 100 wt % metal particles, and a binding agent including water, from about 0.01 wt % to about 5 wt % organic compounds (which includes all organic compounds present, which may be a single organic compound or multiple organic compounds in aggregate), and from about 20 wt % to about 60 wt % copper nitrate (which may be a hydrated copper nitrate). It is noted that the binding agent, particularly with respect to the systems of three-dimensional printing and methods of three dimensional printing, on the other hand, can include total organic compound content and copper nitrate content outside of these ranges.

In more specific detail regarding the particulate build material 110, this can be a particulate material of metal powder, and can be provided as a "dry" powder. The term "dry" refers to particulate build materials that are made up of solid particles without a liquid mixed with the solid particles. Thus, the particulate build material is not typically a slurry or solution. The particulate build material can be devoid of liquid, whether water or other liquids including organic solvents. The particulate build material can include any particulate build material that includes from about 80 wt % to about 100 wt % metal particles based on the total weight of the particulate build material. In other examples, the metal particles can be present in the particulate build material at from about 90 wt % to 100 wt %, from about 95 wt % to 100 wt %, or at about 100 wt %. In one more specific example, the particulate build material can include from about 95 wt % to about 100 wt % copper, which may be elemental copper, a copper alloy, or a blend of copper or copper alloy with other metal or inorganic particles.

The particulate build material 110 particles can be a single phase metallic material composed of one element. In this example, the sintering temperature may be below the melting point of the single element. In another example, the build material particles can include two or more elements, which may be in the form of a single phase metallic alloy or a multiple phase metallic alloy. In these other examples, sintering can occur over a range of temperatures. With respect to alloys, materials with a metal alloyed to a non-metal (such as a metal-metalloid alloy) can be used as well. In some examples, the particulate build material can include particles of aluminum, titanium, copper, cobalt, chromium, nickel, vanadium, tungsten, tungsten carbide, tantalum, molybdenum, magnesium, gold, silver, ferrous alloy, stainless steel, steel, alloys thereof, or admixtures thereof. Alloys of copper can be used to provide metal particles that are less susceptible to oxidation often associated with pure copper. Other specific alloy examples can include AlSi 10 Mg, 2xxx series aluminum, 4xxx series aluminum, CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, stainless steel 430L titanium 6Al4V, and titanium 6Al-4V ELI7.

The temperature(s) at which the metallic particles of the particulate build material 110 fuse together is/are above the temperature of the environment in which the patterning portion of the three-dimensional printing method is performed, e.g., patterning at from about 18° C. to about 300° C. and fusing, e.g., sintering, at from about 500° C. to about 3,500° C. In some other examples, the metallic build material particles may have a melting point ranging from about 700° C. to about 2,500° C., In still other examples, the metallic build material particles may be an alloy having a range of melting points. In certain examples, the three-dimensional green body object can be fused at a peak temperature from about 1,000° C. to about 2,000° C. for a period of time from about 8 hours to about 36 hours to sinter the metal particles together.

The D50 particle size of the particulate build material 110 can be from about 0.5 μm to 200 μm. In some examples, the particles can have a D50 particle size distribution value that can range from about 1 μm to about 150 μm, from about 1 μm to about 100 μm, from about 1 μm to about 50 μm, from about 4 μm to about 150 μm, from about 4 μm to about 100 μm, from about 4 μm to about 50 μm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The shape of the particles of the particulate build material can be spherical, non-spherical, random shapes, or a combination thereof. The particle size can be presented as a Gaussian distribution or a Gaussian-like distribution (or normal or normal-like distribution). Gaussian-like distributions are distribution curves that may appear Gaussian in their distribution curve shape, but which can be slightly skewed in one direction or the other (toward the smaller end or toward the larger end of the particle size distribution range). That being stated, an example Gaussian-like distribution of the metal particles can be characterized using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of 25 μm means that 50% of the particles (by number) have a particle size greater than 25 μm and 50% of the particles have a particle size less than 25 μm. Particle size distribution values may not be related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be referred to as "Gaussian" as typically used.

In more specific detail regarding the binding agent 120, as mentioned, the binding agent can include the liquid vehicle 122, such as a water-based liquid vehicle, e.g., aqueous liquid vehicle, and can also include the copper nitrate 124 that provides the compound that acts as the binder to the particulate build material 110. Thus, the "binding agent" describes the liquid dispersion and the "binder compound" that is carried by the binding agent in this instance includes copper nitrate. In some examples, the copper nitrate may be in the form, for example, of hydrated copper nitrate, e.g., copper nitrate trihydrate, copper nitrate monohydrate, copper nitrate sesquihydrate, copper nitrate hexahydrate, copper nitrate hemipentahydrate, etc. When heat cured, the copper nitrate can form copper hydroxynitrate, which can interact with a surface of the metal particles, thus enhancing part strength of the green body object, which can be beneficial prior to heat fusing for purposes of stable transport, automated transport, surface decaking, etc. in some examples, the part strength can be enhanced to greater than 8 MPa, greater than 10 MPa, or greater than 13 MPa, for example.

The liquid vehicle 122 may include water, organic co-solvent(s), surfactant(s), biocide(s), or any of the ingredients described above. In a particular example, the binding agent can include water, and can also include organic compounds such as organic co-solvent, organic dispersing agents, organic antimicrobials, organic sequestering compounds, organic dispersants, etc. There can be inorganic compounds of some of these and other types of materials used as well. In one example, water can be present at from about 60 wt % to about 99.99 wt %, and in another example, from about 75 wt % to 100 wt %. However, in one more specific example, the water content can be very high and the total organics content can be relatively low, e.g., water present at from about 90 wt % to about 99.99 wt % or even from about 95 wt % to about 99.99 wt %, with a total organic compound content from about 0.01 wt % to about 5 wt %. With high water content and low organic compound content, the high concentration of water can be more efficient at converting the copper nitrate 124 into copper hydroxynitrate during heat curing. At the same time, by including some organic compound(s), such as organic co-solvent and/or surfactant;

there still can be enough organic compound content present to assist with printhead health and fluid jettability.

The organic co-solvent, if present; can be included at from about 0.01 wt % to about 40 wt %, from about 0.01 wt % to about 25 wt %, from about 0.01 wt % to about 5 wt %, or from about 2 wt % to about 5 wt %, based on a total weight of the binding agent. In some examples, the co-solvent can be a high boiling point solvent, which can have a boiling point of about 110° C. or greater. In some examples, the high boiling point co-solvent can have a boiling point from about 110° C. to about 300° C. Example co-solvents can include aliphatic alcohols, aromatic alcohols, alkyl dials, glycol ethers, polyglycol ethers, 2-pyrrolidinones, caprolactams, formamides, acetamides, long chain alcohols, and combinations thereof. For example, the co-solvent can include aliphatic alcohols with a —CH2OH group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl pyrrolidone, 2-ethyl pyrrolidone, 2-methyl-1,3-propanediol, and combinations thereof.

In some examples, if surfactant is included, the surfactant can include surfactants such as the Surfynol® or Dynol® series of surfactants, available from Evonik (Germany). Non-limiting examples of surfactants that can be used include Surfynol® 465, Surfynol® 440, Surfynol® 2502, Surfynol® 420, Surfynol® 104, Surfynol® 480, Surfynol® 485, Dynol® 60, Dynol® 307, Dynol® 604, Dynol® 607, and combinations thereof. Other surfactants that can be used include Tergitol® type surfactants. In some examples, the surfactant can be included in the binding agent in an amount from about 0.01 wt % to about 5 wt %, from about 0.01 wt % to about 3 wt %, from about 0.01 wt % to about 1 wt %, from about 0.1 wt % to about 3 wt %, from about 0.5 wt % to about 5 wt %, or from about 1 wt % to about 5 wt %, based on the total weight of the binding agent.

With respect to antimicrobials that may be included, any compound suitable to inhibit the growth of harmful microorganisms can be included. These additives may be biocides, fungicides, and other microbial agents. Examples of suitable microbial agents can include, but are not limited to, Nuosept® (Troy, Corp., USA), Ucarcide™, Kordek™, Rocima™, Kathan™ (all available from The Dow Chemical Co., USA), Vancide® (R.T. Vanderbilt Co., USA), Proxel® (Arch Chemicals, USA), Acticide® B20 and Acticide® M20 and Acticide® MBS. (blends of 2-methyl-4-isothiazolin-3-one (MIT), 1,2-benzisothiazolin-3-one (BIT), and Bronopol® (Thor Chemicals, United Kingdom); Axide™ (Planet Chemical, Singapore); Nipacide™ (Clariant, Switzerland), etc.

Other compounds may also be included, such as sequestering agents, e.g., EDTA (ethylene diamine tetra acetic acid), to eliminate the deleterious effects of heavy metal impurities. Buffers or buffer solutions may be used to control the pH of the ink. Viscosity modifiers and buffers may also be present, as well as other additives to modify properties of the respective fluids. Anti-kogation compounds can also be included, which can be used to reduce deposits of dried solids on a printhead. An anti-kogation agent can be included to prevent the buildup of dried solids on the printhead. Examples of suitable anti-kogation agents can include oleth-3-phosphate (commercially available as Crodafos® O3A or Crodafos® N-3 acid), dextran 500 k, Crodafos® HCE (phosphate-ester from Croda Int, United Kingdom), Crodafos® N10 (oleth-10-phosphate from Croda Int., United Kingdom), or Dispersogen® LFH (polymeric dispersing agent with aromatic anchoring groups, acid form, anionic, from Clariant, Switzerland); etc.

Three-Dimensional Printing Systems

Figure 2:
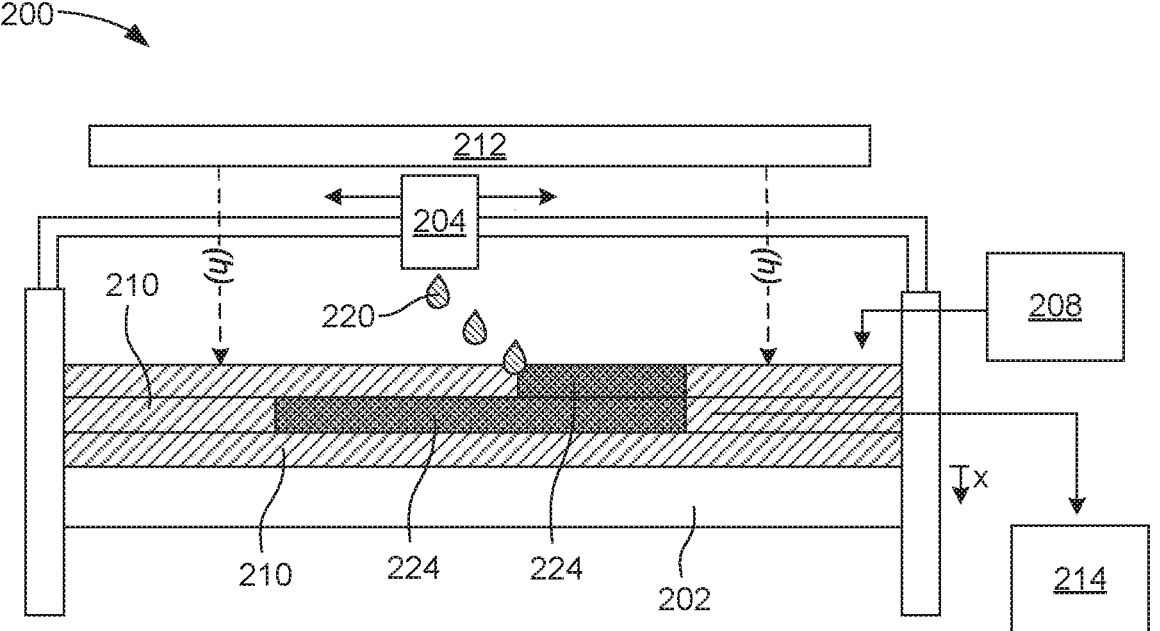
FIG. 2 graphically illustrates an example three-dimensional printing kit in an example three-dimensional printing system in accordance with the present disclosure.

FIG. 2 shows an example three-dimensional printing kit 200 being used in a three-dimensional printing system to form a green body object. In this example, the particulate build material 210 can be as described at 110 in relation to FIG. 1 and can be deposited from a particulate build material source 208 onto a build platform 202 where the particulate build material can be flattened or smoothed, such as by a mechanical roller or other flattening technique. In this example, the binding agent 220, which can be as described at 120 in relation to FIG. 1, can be ejected onto the particulate build material from a fluid ejector 204, for example, to provide for selectively patterning the particulate build material. The binding agent can be ejected onto an area of the powder bed that corresponds to a layer of a three-dimensional printed object, such as from a three-dimensional object model or computer model. The fluid ejector(s) can deposit fluid(s) in a layer that corresponds to the layers of the three-dimensional object and can be used to form a green body three-dimensional object in any orientation. For example, the three-dimensional object can be printed from bottom to top, top to bottom, on its side, at an angle, or any other orientation. The orientation of the three-dimensional object can also be formed in any orientation relative to the layering of the particulate build material. For example, the three-dimensional object can be formed in an inverted orientation or on its side relative to the build layering within the particulate build material. The orientation of build or the orientation of the three-dimensional object to be built within the particulate build material can be selected in advance or even by the user at the time of printing, for example.

Heat (h) can be used, such as from a heat source 212 at the various layers (or group of layers, or after the three-dimensional green body object is formed) to remove solvent from the binding agent, and in accordance with the present disclosure, after the green body object is formed, to heat cure the green body object. In one example, heat can be applied from overhead (e.g., prior to application of the next layer of particulate build material, or after multiple layers are formed, etc.), and/or can be provided by the build platform from beneath the particulate build material and/or from the particulate build material source (preheating particulate build material prior to dispensing on the build platform or previously applied three-dimensional object layer). Again, these same heating sources or others can be used for heat curing the green body object 224 (shown in the process of being built) after formation. However, during the build, after individual layers are printed with binding agent, the build platform can be dropped a distance of (x), which can correspond to the thickness of a printed layer in one example, so that another layer of the particulate build material can be added thereon and printed with the binding agent, etc. The process can be repeated on a layer by layer basis until a green body object is formed that is stable enough to move to a fusing oven 214 suitable for fusing, e.g., sintering, annealing, melting, or the like. In this example, the fusing oven can alternatively be used for heat curing the green body object by soaking the green body object at heat curing temperatures prior to raising the temperature within the oven to the much higher fusing temperatures. The green body object in this example includes a three-dimensional object formed from solidified green body object layers, which include both particulate build material and binding agent that delivers the copper nitrate as a binder compound thereto. In other words, the materials and processes described herein can be used to form a three-dimensional green body object made up of particulate build material held together by the binder compound, e.g., the copper nitrate. In certain examples, the three-dimensional green body object can be formed by depositing thin layers of the particulate build material in a powder bed and then jetting a binding agent onto the layers to form individual slices of the three-dimensional green body. After forming one slice of the three-dimensional green body object in this way, a new layer of particulate build material can be deposited on the powder bed and the next slice can be formed by jetting the binding agent, and this can be repeated until a complete three-dimensional green body object is formed.

Regarding the application of heat to the green body object after formation, the green body object can be cured by bringing or retaining the temperature of the green body object to within the range of about 120° C. to about 200° C. for 30 minutes to 8 hours sufficient to convert from about 30 wt % to 100 wt % of the copper nitrate applied to the individual build material layers to copper hydroxynitrate. This can occur in the powder bed itself within the particulate build material 210 that was not contacted by the binding agent, in a separate heating device (such as a fusing oven 214), or a combination of both. In some cases, the powder bed can be used for heat curing the green body object for a first period of time within a first temperature range, e.g., from about 70° C. to about 120° C. for about 30 minutes to about 4 hours, and then a fusing oven or other heating device (outside of the powder bed) can be used for heat curing for a second period of time within a second temperature range, e.g., within the range of about 120° C. to about 200° C. for about 30 minutes to about 8 hours, or within the range of about 130° C. to about 180° C. for about 1 hour to about 4 hours. Thus, for clarity, the term "heat curing" and "fusing" represent multiple different temperature ranges and heating times and should not be confused. The present disclosure is drawn to heat curing the green body object in preparation for fusing to form the solidified metal object. However, in greater detail, there may also be one or two different heat curing events. For further clarity, heat curing of the green body object can occur in the powder bed material and/or a separate heat curing device; however, in some examples, heat curing in the powder bed may occur within lower temperature ranges to avoid green body object surface caking that can occur at higher temperatures, Heat curing in a heating oven may occur at a similar temperature range or can be at an even higher temperature. In accordance with this, heat curing in the powder bed or elsewhere within a lower temperature range, e.g., from 70° C. to about 120° C., can bring the green body object part flexural strength to within the range of about 6 MPa to about 10 MPa, in some examples. Heat curing at the higher temperatures can bring the part flexural strength to within the range of about 8 MPa to about 15 MPa, in some examples. "Flexural strength," or the modulus of rupture (or bend strength) can be defined as the stress in a material just before it yields in a flexure test.

Figure 5:
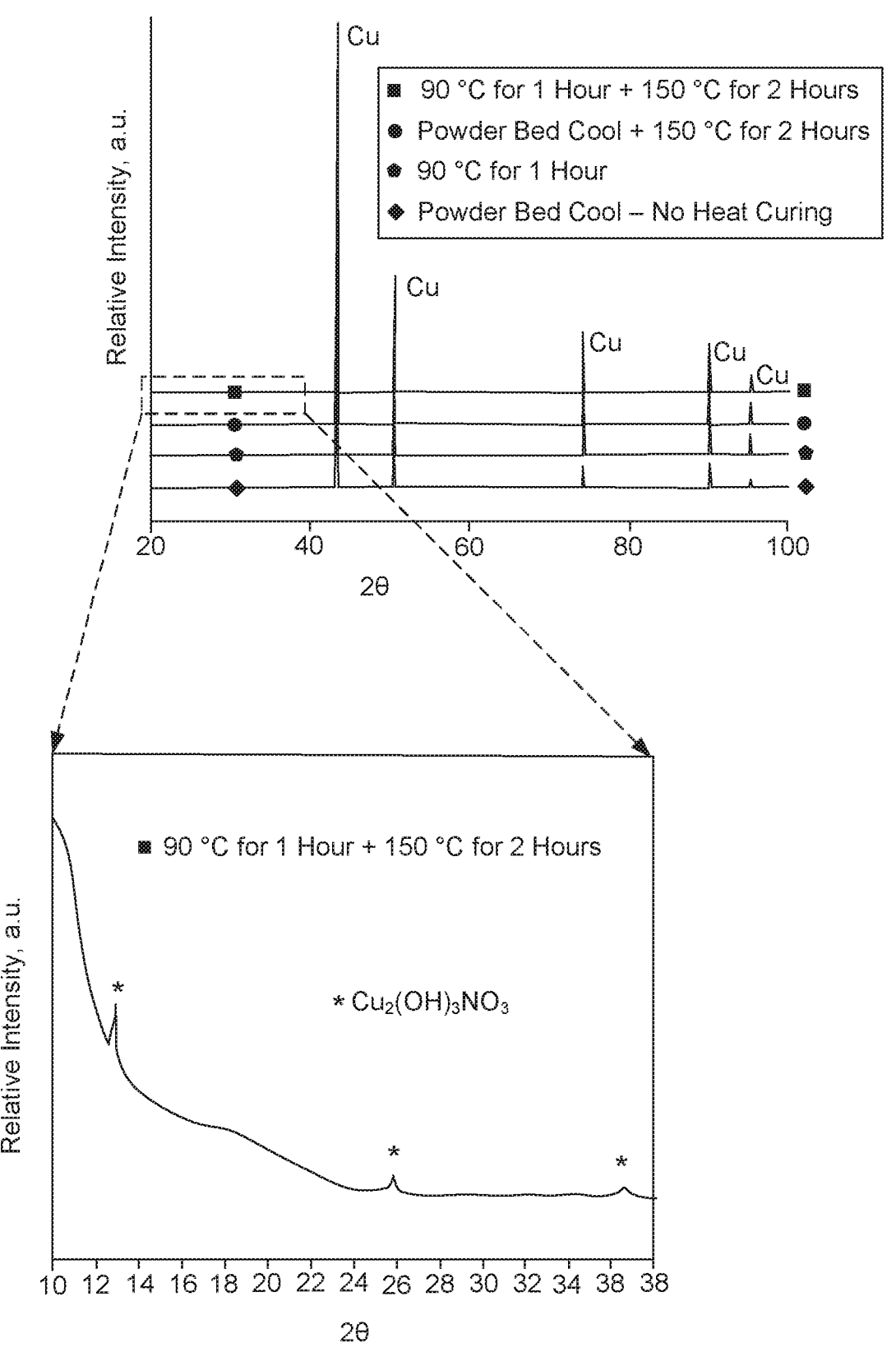
FIG. 5 provides data collected by X-ray diffraction (XRD) of various example green body objects in accordance with the present disclosure.

An example test is shown in FIG. 5 hereinafter. This can sometimes be referred to here as "strength" or "green body object strength" or "part strength."

By heat curing a green body object within the powder bed, benefits can be achieved such as providing enough part flexural strength to allow for automation of movement and/or decaking of the green object. Subsequent heat curing in the fusing oven or other heating device can provide additional green body object flexural strength. It is noted that the example given above where heat curing occurs in the powder bed and in the fusing oven (or other heating device) is by example only, but provides one practical example of how the green body object can be prepared with good green body object part flexural strength, which can be beneficial when fusing the green body object to form the rigid and fused, e.g., sintered, metal object. Notably, "heat curing" should not be confused with "fusing" of the green body object to form the fused metal object.

In some examples, the three-dimensional green body object can have sufficient flexural strength to hold its own shape until the time that the three-dimensional green body object is sintered to form a final metal three-dimensional printed article. In further examples, the three-dimensional green body object can be sufficiently strong to withstand any processing and handling that occurs before sintering. For example, the three-dimensional green body object can be removed from the powder bed and cleaned to remove any loose build material particles that have become caked or weakly attached to the surface of the three-dimensional green body object. In some examples, this cleaning can be performed by brushing, sandblasting, or other methods. If the three-dimensional green body object does not have sufficient strength, then these processes can break off parts of the three-dimensional green body object, destroy surface details of the three-dimensional green body object, and so on. Thus, the green body objects formed using the multi-fluid kits, three-dimensional printing kits, and methods described herein can have increased strength, e.g., flexural strength, and can be removed from the powder bed and prepared for sintering with less risk of breakage. Sintering can include exposing the green body object to heat to sinter the metal particles of the particulate build material together and form a sintered three-dimensional printed object. The temperature at which the green body object is heated to fuse the metal particles and form the final three-dimensional printed object is referred to herein as the fusing temperature. In some examples, the polymeric binder can thermally decompose or be burned off during the sintering process.

Methods of Three-Dimensional Printing

In another example, as shown in FIG. 3, a method 300 of three-dimensional printing can include iteratively applying 310 individual layers of a particulate build material comprising from about 80 wt % to about 100 wt % metal particles, and based on a 3D object model, selectively and iteratively applying 320 a binding agent to the individual layers of the particulate build material to define a green body object formed from multiple individual layers within a powder bed of the particulate build material. In this example, the binding agent can include an aqueous liquid vehicle and a copper nitrate. The method can further include heat curing 330 the green body object by heat soaking the green body object at a temperature within the range of about 70° C. to about 200° C. for about 30 minutes to about 8 hours after the green body object is formed, wherein after heat curing, from about 30 wt % to 100 wt % of the copper nitrate applied to the green body object is in the form of copper hydroxynitrate.

Heat curing can occur at one or multiple locations, such as while the green body object remains in the powder bed (after the build) at from about 70° C. to about 120° C. for about 30 minutes to about 4 hours. At temperatures greater than 120° C. in the powder bed, excessive caking may occur at the surface of the green body object. Thus, in other examples, the green body object can be removed and heated outside of the powder bed. In some examples, the heat curing can likewise occur within the range of about 120° C. to about 200° C., or from about 130° C. to about 180° C., for a period of time for about 30 minutes to about 8 hours, or from about 1 hour to about 4 hours. Heat curing can likewise occur after formation of the green body object while in the powder bed, and then subsequently after removal from the powder bed using a two stage heat curing approach. In some examples, from about 75 wt % to 100 wt % of the copper nitrate applied to the individual build material layers can be converted to copper hydroxynitrate as a result of heat curing. In further detail, the method can also include fusing the green body object in a fusing oven at a fusing temperature from about 600° C. to about 3,500° C. for a period of time from about 1 hour to about 30 hours to form a heat-fused metal object. Thus, in one specific example, the heat curing can occur in the fusing oven prior to raising a temperature therein to the fusing temperature. The binding agent can include, for example, water, from about 0.01 wt % to about 5 wt % organic compounds, and from about 20 wt % to about 60 wt % of the copper nitrate. However, these compounds or classes of compounds can be included outside of these ranges as outlined previously with respect to the three-dimensional printing kits. In one example, at locations wherein the binding agent is selectively and iteratively applied, the binding agent can be applied to the individual layers or particulate build material such that from about 0.25 g to about 0.35 g of copper nitrate is applied per 1 cm³ of particulate build material. In one specific example, this can be based on a 12 ng drop weight. The drop weight is given not to be limiting, but to establish an example suitable drop weight that can be used for three-dimensional printing at these copper nitrate (mass) to particulate build material (volume) ratios. Drop weights from about 6 ng to about 15 ng, from about 8 ng to about 14 ng, or from about 9 ng to about 12 ng, can be used alternatively in some examples.

Following application of the binding agent, the particulate build material and fluid(s) applied thereto can be heated to an elevated temperature to assist with enhancing the object flexural strength via heat curing. As noted, heat curing can occur while the three-dimensional object is still in the powder bed of particulate build material and/or heat curing can occur at a separate location using a heating device when the green body object is removed from the powder bed material. When heat curing in the powder bed, heat soaking for a period of time can be at a temperature ranging from about 70° C. to about 120° C., from about 80° C. to about 120° C., from about 80° C. to about 110° C., or from about 90° C. to about 120° C. Heat curing in the powder bed can occur at from about 30 minutes to about 4 hours, from about 1 hour to about 4 hours, from about 30 minutes to about 2 hours, or from about 1 hour to about 3 hours. The times and temperatures for heat curing in a device outside of the powder bed can be as follows: heat curing the green body object outside of the powder bed at a temperature within the range of about 70° C. to about 200° C., from about 120° C. to about 200° C., from about 130° C. to about 180° C., from about 140° C. to about 200° C., or from about 90° C. to about 180° C.; and heat soaking for a period of time during heat curing for a time increment from about 30 minutes to about 8 hours, from about 30 minutes to about 4 hours, from about 1 hour to about 8 hours, or from about 1 hour to about 4 hours. As a note, the heating device that can be used when the green body object is removed from the powder bed may be the same device that is ultimately used for fusing the green body object to form the heat fused metal object. In this scenario, the heating device would be ramped up to a temperature within one or more of the ranges recited above and allowed to heat soak for a period of time as set forth in the time ranges above. After heat curing, the temperature could then be ramped up for heat fusing as outlined in further detail herein. It is noted that these temperature ranges and time increments can also be used in the context of the systems of three-dimensional printing or used with the three-dimensional printing kits described herein.

Upon heat curing, the three-dimensional green body object with enhanced flexural strength can be moved to a heating device (if not already moved there), such as a fusing oven. In some examples, the heat curing in the powder bed material may be used to promote a partial cure and to provide some enhanced object strength prior to heat curing in the heating device outside of the powder bed, or a more fragile part can be moved to the heating device for heat curing prior to fusing. In some examples, with respect to fusing, the heating device can also be the fusing device, e.g., a sintering oven. In one example, after heat curing, the three-dimensional green body object can be heated to a sintering or fusing temperature ranging from about 500° C. to about 3,500° C., including at a temperature within the range where the metal particles are fused together. In another example, the temperature can range from about 600° C. to about 1,500° C., or from about 800° C. to about 1200° C., or from about 1,000° C. to about 2,000° C. In further detail, the fusing temperature range can vary, depending on the material, but in one example, the fusing temperature can range from about 10° C. below the melting temperature of the metal particles of the particulate build material to about 100° C. below the melting temperature of the metal particles of the particulate build material. In another example, the fusing temperature can range from about 50° C. below the melting temperature of the metal particles of the particulate build material to about 100° C. below the melting temperature of the metal particles of the particulate build material. The fusing temperature can depend upon the particle size and period of time that heating occurs, e.g., at a high temperature for a sufficient time to cause particle surfaces to become physically merged or composited together. For example, a fusing temperature for stainless steel can be about 1400° C. and an example of a fusing temperature for aluminum or aluminum alloys can range from about 550° C. to about 620° C. Temperatures outside of these ranges can be used as determined on a case by case basis.

In certain examples, the three-dimensional green body object can be gradually heated from the heat curing temperature to the fusing or sintering temperature. As the binder compound used in these examples is copper nitrate, the copper content of the copper nitrate can become incorporated into the fused three-dimensional object, unlike polymer binder which would normally burn off or become decomposed at about 300° C. to about 500° C.

In some examples, during heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the fused three-dimensional object from the oven and cooling (or annealing by controlling the cool down rate in the oven), the fused three-dimensional object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "devoid" refers to a numerical quantity that can be zero or can be substantially zero, e.g., a quantity may be permissible in trace amounts, such as up to 0.1 wt % of a formulation or composition.

As used herein, the term "green" when referring to a green part, green body object, green body object layer, etc. refers to any intermediate structure that has been solidified and/or cured (prior to heat fusing), furthermore, a green body object can include particulate build material and the copper nitrate as a binder compound to bind the particulate build material together. The term "green body" is used to refer to a multi-layered object that is (weakly) bound together, but upon some water removal, can exhibit sufficient flexural strength to be moved to a fusing oven, for example. However, in accordance with the present disclosure, the green body object may still be considered to be a green body object after it is heat cured in accordance with the present disclosure. A cured green body object can be further solidified to have enhanced strength but is still not in a state of having been fused to form a metal object. It is to be understood that any build material that is not patterned with binding agent is not considered to be part of the green body, even if it is adjacent to or surrounds the green body. For example, unprinted particulate build material acts to support the green body object while contained therein, but the particulate build material is not part of the green body object unless it is printed with binding agent to generate a solidified part prior to fusing.

As used herein, the terms "three-dimensional part," "three-dimensional object," or the like, refers to the target three-dimensional object that is being built, and can be a green body three-dimensional object or a fused three-dimensional object, depending on the context. However, in some instances, for clarity, the three-dimensional object can be referred to as a "fused" three-dimensional object, indicating it has been fused, e.g., sintered, annealed, melted, etc., or a "green body," "three-dimensional green body object," or "green" three-dimensional object, indicating it has been solidified or is in the process of solidification sufficient for movement, but not yet heat fused.

"Binding agent" refers to a fluid that includes water and copper nitrate as a binding compound, and which is effective for binding layers of particulate build material when forming a green body. The binding agent is typically applied to form a three-dimensional green body object. Upon heat curing, the copper nitrate remains, even if some of the water and/or organic compound(s) have been removed.

The term "fluid" does not infer that the composition is free of particulate solids, but rather, can include solids dispersed therein.

As used herein, "kit" can be synonymous with and understood to include a plurality of compositions where the different compositions can be separately contained in separate containers prior to and/or during use, e.g., building a green three-dimensional object for subsequent fusing. These compositions of the "kit" can be combined together during a three-dimensional build process. The containers can be any type of a vessel, box, or receptacle made of any material.

The term "fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, a plurality of items, structural elements, compositional elements, and/or materials may be presented in a common list for convenience. However, these lists should be construed as though the various members of the list are individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as if the various numerical values and sub-ranges are explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following are illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Three-Dimensional Printing Kits

Three-dimensional printing kits are prepared that include copper particulate build material and a binding agent.

The copper particulate build material in both kits of this example include 100 wt % copper powder having a spherical morphology, a D90 particle size of 45 μm, and a D50 particle size of 25 μm.

Two alternative binding agents are prepared in accordance with the formulations shown in Table 1, as follows:

TABLE 1

| Copper Nitrate-based Binding Agents | | |
| --- | --- | --- |
| Ingredient | Binding Agent 1 (Wt %) | Binding Agent 2 (Wt %) |
| Copper Nitrate Trihydrate | 40 | 40 |
| 2-Pyrrolidone | 7.5 | 2 |
| Dowfax 2A1 | 0.5 | 0.5 |
| Capstone FS-35 | 0.025 | 0.25 |
| DI Water | Balance | Balance |

Example 2—Preparation of Green Body Objects for Strength Testing

The three-dimensional printing kits of Example 1 are prepared for printing green body objects in a powder bed of the copper particulate build material by selectively and iteratively applying the binding agent in a layer-by-layer manner until a green body object is formed. The layers of copper particulate build material applied per layer in this example are about 60 μm to about 100 μm thick. Binding Agent 1 or 2 is applied at about a 1:8 to about a 1:12 weight ratio of binding agent to particulate build material (at locations where the binding agent was applied). When applied at 1/1200 dpi, this can provide more than 100% coverage, and the copper nitrate content from the binding agent to copper particulate build material can be combined at the individual layers at an average weight ratio of about 1:15 to about 1:35, for example. Using a 4-pass print cycle, the binding agent is applied at 17 inch per second of carriage speed with a 5 second time delay setting. The binding agent is jetted during $1^{st}$ and $3^{rd}$ pass of the print cycle. Heat is applied during the build from the build platform at 90° C. but may alternatively or additionally be applied from a heat source thereabove. In some instances, heat can be applied on a layer-by-layer basis using high intensity short pulses of light. Green body objects prepared in this example have a dimension of 5 mm (height) by 5 mm (depth) by 40 mm (length), to form an elongated bar that can be tested for flexural strength. Some green body object elongated bars prepared were not further heat cured and the bed was allowed to cool to room temperature (RT), some degree of heat curing may occur within the powder bed material by retaining the powder bed temperature for an additional 1 hour at 90° C., some were allowed to cool to RT and then heat cured for 2 hours at 150° C., and some were allowed to cure in the powder bed material for the additional 90° C. (1 hour) followed by additional heat curing in an external oven at 150° C. for 2 hours.

Example 3—Flexural Strength

Off-line flexural strength testing is conducted on the three types of samples using a setup such as that shown at 400 in FIG. 4, where binding agent prepared in accordance with Example 1 (Table 1; Binding Agent 1) is used to prepare press bar samples 424 from 100 wt % copper as described in Example 2. The individual green body object elongated bar samples are then cooled and submitted to a 3-point bend Instron® tester to measure their strength. The Instron® tester, available from Instron (USA), includes a support 450, supporting pins 452 with a 27 mm span, and a loading pin 454 which applied increasing force (F) to the individual press bar samples until the samples failed (broke under force). For the various individual green body object elongated bar sample types (no heat curing, heat curing in the powder bed, heat curing in a separate heating oven, and heat curing in both the powder bed and in a separate heating oven), several bars were made and a range of maximum flexural stress (MPa) was determined, as set forth in Table 2.

TABLE 2

| Flexural Strength of Green Body Object Elongated Bars | |
| --- | --- |
| Thermal Treatment After Green Body Object Build | Approximate Flexural Strength Range (MPa) |
| Powder Bed Cooled to RT → No Heat Applied | 3-5 |
| 90° C. Powder Bed Heat Retained → Heat Curing at 90° C. in Powder Bed for Additional 1 Hour | 6-10 |
| Powder Bed Cooled to RT → Heat Curing at 150° C. for 2 Hours | 8-11 |
| 90° C. Powder Bed Heat Retained → Heat Curing at 90° C. in Powder Bed for Additional 1 Hour → Heat Curing at 150° C. after Powder Bed Heat Curing | 11-14 |

As can be seen from Table 2, by heat curing in the powder bed, the flexural strength of the green body objects was approximately doubled. By heat curing in a heating oven, either at still a higher temperature, with powder bed heat curing or without powder bed heat, the flexural strength was improved about 20% to about 30% more than powder bed heat curing alone. It is expected that the flexural strength after heat curing may even be slightly improved in some instances with the use of more water content and less organic content in the binding agent, such as is present in Binding Agent 2.

By way of one specific example to illustrate how the ranges in Table 2 are established, one example green body object that underwent a force displacement test using the three-point bend setup of FIG. 4 provided data indicating a flexural modulus ($E_f$) of about 2.6 GPa and a break load of 40 N, which correlates with an 11.4 MPa strength.

Example 4—Formation of Copper Hydroxynitrate ($Cu_2(OH)_3NO_3$)

An evaluation was done to determine why the flexural strength improves with powder bed heat curing, and more particularly, even more so with higher temperature and longer heat soaking, e.g., heat curing, as shown in Table 2 above. Notably, heat curing can provide some dehydration of the copper nitrate trihydrate. However, this may not be the only reason heat curing provides better flexural strength. It was found that in addition to the production of some copper oxides, upon heat curing, there was also some copper hydroxynitrate that was formed, which is believed to contribute to the enhanced flexural strength after heat curing. The oxidation of the copper nitrate trihydrate to various intermediate compounds can be verified by X-ray diffraction (XRD), as shown by way of example in FIG. 5.

In FIG. 5, XRD analysis shows the copper phase of the green body objects, along with low intensity peaks (shown in an expanded view) corresponding with the presence of copper hydroxynitrate. As the presence of copper hydroxynitrate increases, the flexural strength of the green body object can increase as well. There is not very much copper hydroxynitrate present in the green body objects where the powder bed was cooled to room temperature and no powder bed heat curing or oven heat curing occurred. With more thermal heat curing after formation of the green body object, more copper hydroxy nitrate is formed, which appears to correspond with enhanced flexural strength. In this example, it is belied that greater than about 75 wt % of the copper nitrate applied is converted to copper hydroxynitrate.

What is claimed is:

1. A method of three-dimensional printing, the method comprising:
   iteratively applying individual layers of a particulate build material comprising from about 80 wt % to about 100 wt % of metal-containing particles;
   based on a 3D object model, selectively and iteratively applying a binding agent to the individual layers of the particulate build material to define a green body object formed from multiple individual layers within a powder bed of the particulate build material, wherein the binding agent comprises an aqueous liquid vehicle and a copper nitrate; and
   heat curing the green body object by heat soaking the green body object at a temperature of from about 70° C. to about 200° C. for a time period of from about 30 minutes to about 8 hours after the green body object is formed,
   wherein after the heat curing, from about 30 wt % to 100 wt % of the copper nitrate in the green body object is in the form of copper hydroxynitrate.

2. The method of claim 1, wherein the particulate build material comprises from about 95 wt % to about 100 wt % of copper.

3. The method of claim 1, wherein the metal-containing particles are selected from the group consisting of aluminum particles, aluminum alloy particles, titanium particles, titanium alloy particles, copper particles, copper alloy particles, cobalt particles, cobalt alloy particles, chromium particles, chromium alloy particles, nickel particles, nickel alloy particles, vanadium particles, vanadium alloy particles, tungsten particles, tungsten carbide particles, tantalum particles, tantalum alloy particles, molybdenum particles, molybdenum alloy particles, magnesium particles, magnesium alloy particles, gold particles, gold alloy particles, silver particles, silver alloy particles, ferrous alloy particles, stainless steel particles, steel particles, and an admixture thereof.

4. The method of claim 1, wherein the aqueous vehicle of the binding agent comprises organic compounds, and wherein from about 60 wt % to 100 wt % of the organic compounds are in the form of an organic co-solvent, a surfactant, or a combination thereof.

5. The method of claim 1, wherein the copper nitrate is a hydrated copper nitrate.

6. The method of claim 1, wherein the heat curing of the green body object is at a temperature of from about 70° C. to about 120° C. for a time period of from about 30 minutes to about 4 hours while the green body object is within the powder bed.

7. The method of claim 1, further comprising:
   removing the green body object from the powder bed; and
   further heat curing the green body object at a temperature of from about 120° C. to about 200° C. for a time period of from about 30 minutes to about 8 hours.

8. The method of claim 1, wherein the heat curing of the green body object occurs at a temperature of from about 70°

C. to about 120° C. for a time period of about 30 minutes to about 4 hours while the green body object is within the powder bed, and the method further comprises subsequently heat curing the green body object at a temperature of from about 120° C. to about 200° C. for a time period of from about 30 minutes to about 8 hours after removing the green body object from the powder bed.

9. The method of claim 1, wherein after the heat curing, from about 75 wt % to 100 wt % of the copper nitrate in the green body object is copper hydroxynitrate.

10. The method of claim 1, further comprising fusing the green body object in a fusing oven at a fusing temperature of from about 600° C. to about 3,500° C. for a time period of from about 1 hour to about 30 hours to form a heat-fused, metal-containing object.

* * * * *